Oct. 20, 1959  F. P. ROBBINS  2,909,179
SPRING BINDER
Filed May 10, 1957
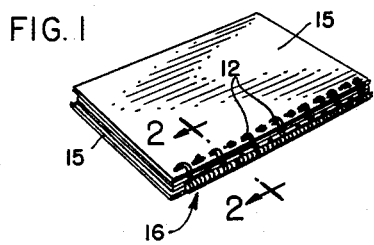
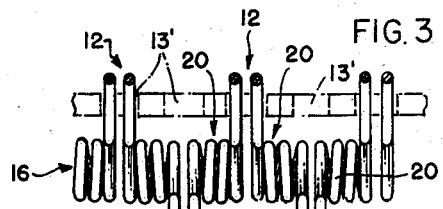
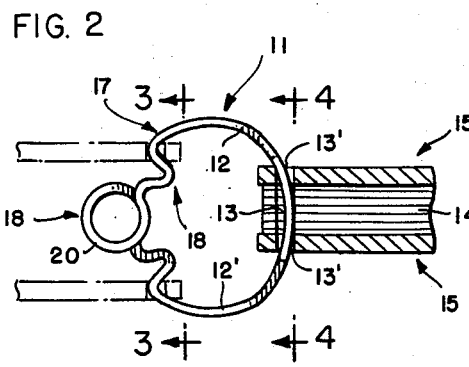
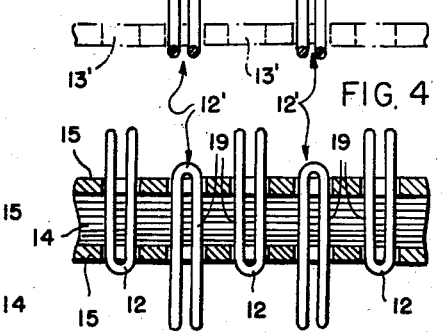
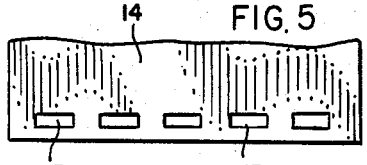
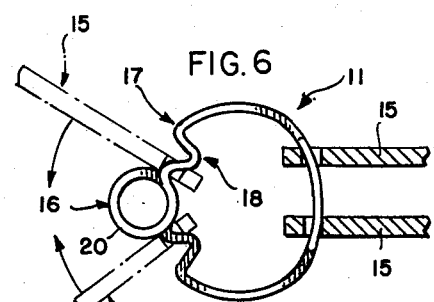
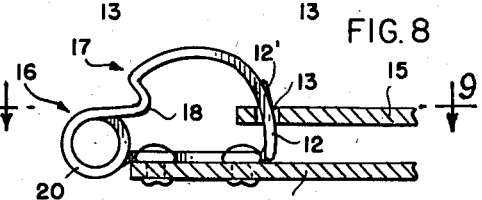
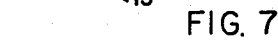
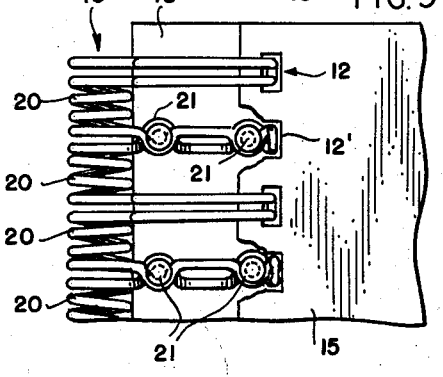
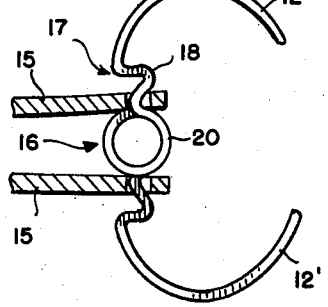
INVENTOR:—
FREDERICK P. ROBBINS
BY:—
Marzall, Johnston, Cook & Root
ATTORNEYS.

2,909,179
SPRING BINDER
Frederick P. Robbins, Highland Park, Ill.

Application May 10, 1957, Serial No. 658,352

9 Claims. (Cl. 129—24)

The present invention relates in general to loose leaf binders, and has more particular reference to an improved spring binder construction providing normally closed loose-leaf sheet carrying tines that may be opened to permit attachment on or removal from the tines of loose-leaf sheets or pages, merely through manipulation of cover panel members mounted thereon.

An important object of the invention is to provide an improved binder for loose-leaf page sheets comprising a spring structure having sheet engaging tines normally urged toward leaf engaging and retaining position, said tines being adapted to receive relatively rigid panels forming cover members, and being formed for interlocking engagement therewith, to permit the panels to be manipulated to shift the tines to relatively open, leaf sheet releasing position.

Another important object is to provide a loose-leaf sheet spring binder embodying means forming spaced apart and relatively offset or staggered and curved or bowed sheet engaging tines alternately disposed in oppositely facing directions and resiliently urged mutually in opposite directions toward relatively closed position, in which the terminal sheet engaging and receiving ends of alternate tines extend in mutually overlapping relationship, said curved tines being retractable from said mutually overlapping relationship, to separate the ends thereof and permit loose leaf sheets to be applied upon or removed from engagement with the sheet engaging ends of said tines.

Another important object is to form the tines and tine urging spring means from a length of spring material, such as wire, formed to provide spaced apart, leaf engaging tines and intermediate, helically coiled, tine urging spring portions, said tines being alternately bowed in opposite directions so that some of them may engage tine receiving perforations of loose leaf sheets from one side of said sheets, while the remaining tines may engage sheet perforations from the opposite side of the sheets.

A further object is to provide a spring binder for loose-leaf sheets embodying spaced apart tines interconnected with tine biasing spring means for yieldingly urging said tines rockingly toward relatively closed position about an axis of rotation, said tines, adjacent said axis, being kinked for interlocking engagement with a cover panel formed with openings for receiving said tines, whereby said cover, when locked upon the kinked portions of said tines, may exert leverage thereon to rotate the same about said axis against the influence of said bias spring means, in order to position the tines in open or leaf releasing position.

Another important object is to provide a binder of the character mentioned comprising a plurality of spaced apart tines formed as hooks, and yieldingly urged in a direction to engage the hooks with a cooperating tablet board upon which the binder is resiliently mounted, said tines being kinked for interlocking engagement with a relatively rigid cover panel supported on said tines, whereby the panel may be engaged with the tines as a lever for shifting them in a direction to release the ends of the tines from engagement with the cooperating member.

Another important object is to provide a loose-leaf sheet spring binder of exceedingly simple configuration and adapted for low cost manufacture on conventional spring winding equipment, the binder comprising a single length of wire coiled continuously, in accordance with a constantly repetitive pattern to provide spaced apart leaf engaging tine portions and intermediate tine urging spring portions.

The foregoing and numerous other important objects, advantages and inherent functions of the invention will become apparent as the same is more fully understood from the following description, which, taken in connection with the accompanying drawings, discloses preferred embodiments of the invention.

Referring to the drawings:

Fig. 1 is a perspective view of a loose-leaf sheet spring binder structure embodying the present invention;

Fig. 2 is a sectional view taken substantially along the line 2—2 in Fig. 1;

Figs. 3, 4 and 5 are sectional views respectively taken substantially along the lines 3—3, 4—4 and 5—5 in Fig. 2;

Figs. 6 and 7 are sectional views similar to Fig. 2, and showing the structure respectively in relatively closed position ready to be opened, and in relatively open position;

Fig. 8 is a sectional view like Fig. 2, for the purpose of illustrating a modified structure embodying the present invention; and Fig. 9 is a sectional view taken substantially along the line 9—9 in Fig. 8.

To illustrate the invention, the drawings show loose-leaf sheet spring binders 11 comprising spring urged tines 12 and 12' adapted for engagement in suitable tine receiving openings 13 formed in loose-leaf sheets 14, and also in corresponding openings 13' formed in relatively rigid cover forming panels 15, adapted for removable attachment on the spring binder 11, together with the loose-leaf sheets 14.

In addition to the tines 12 and 12', each spring binder may embody spring means 16 drivingly connected with the tines for normally urging or biasing the same toward relatively closed, leaf sheet holding position, the tines being kinked, as at 17, to form shoulders 18 adapted for interlocking engagement with the cover panels 15, as at the perforations 13' thereof, in order to permit the relatively rigid cover panels to function as leverage means for shifting the tines away from relatively closed leaf sheet retaining position against the contrary influence of the spring means 16.

To these ends, as shown more particularly in Figs. 1-6 of the drawings, the spring binder 11 preferably comprises a single continuous length of spring material, such as steel wire, for example, formed to provide the tines 12 and 12' as hairpin loops having parallel leg portions 19 disposed at intervals in the length of wire from which the binder is made. Intermediate the tine forming loops, the binder forming wire may be coiled to provide helical spring sections 20. The legs 19 of alternate tine forming loops may be relatively bowed in opposite directions so that the leaf sheet engaging ends of the tines, remote from the tine biasing spring portions 20, may extend in overlapping spaced apart relationship, in a common, generally cylindrically curved plane, the ends of adjacent tines facing alternately in opposite directions, to thereby extend through the tine receiving openings 13 and 13' of the loose-leaf sheets and cover panels alternately from opposite sides thereof, in order to retain the cover panels and loose-leaf sheets against removal from the binder, so long as the tines 12 and 12' remain in relatively closed end overlapping position.

The tine urging spring portions 20 serve normally to hold the oppositely curved tines yieldingly in relatively closed sheet and cover panel holding position. When in such position, the cover panels and sheets may be freely moved on the curved tines to relatively open and close the cover panels and give access to the surfaces of the binder mounted sheets.

The cover panels 15, however, may be moved on the tines to the kinked portions 17 thereof and may then be angulated into position interlockingly seating the perforated portions of the cover panels on the shoulders formed by said kinked portions, substantially as shown in dotted lines in Fig. 6 of the drawings. When so arranged, the cover panels form levers fulcrumed on the spring portions 20 and rockable thereon from the dotted line positions shown in Fig. 6, to the positions illustrated in Fig. 7, in order thus to draw the tines apart from the relatively closed, sheet holding position shown in Fig. 6, to the relatively open sheet releasing position illustrated in Fig. 7.

When the tines are in such relatively open position, leaf sheets 14 may be easily detached from the tines in order to remove the sheets from the binder; or sheets may be applied upon the tines when the same are in open position, in order to mount the sheets in the binder, the sheets becoming secured against detachment in the binder by releasing the cover panels for return from the Fig. 7 position to the binder closed position shown in dotted lines in Fig. 6, after which the cover panels may be disengaged from the shoulder forming, kinked portions of the tines and returned to the normal sheet enclosing position shown in solid lines in Figs. 2 and 6.

The embodiment illustrated in Figs. 8 and 9 shows a modified form of binder, as adapted for application to a loose leaf tablet board 15'. In such embodiment, the tines 12', on one side of the spring binder, may be formed to provide eyelets 18' adapted to receive fastening members 21 for securing one side of the spring binder rigidly to the tablet board 15', as at one end thereof. The spring portions 20, in the embodiment shown in Figs. 8 and 9, serve to yieldingly urge the remaining tines 12 of the binder in a direction to normally press the ends thereof, remote from the spring portions 20, against the tablet board 15' intermediate the ends of the eyelet forming tines 12' which are secured on said board with the ends thereof projecting upwardly of the board between the board engaging ends of the spring pressed tines 12. A cover panel 15 may be mounted on the tines 12 in position to overlie binder mounted leaf sheets supported, as a binder attached stack, upon the tablet board 15'. The cover panel 15 of the Figs. 8 and 9 embodiments may be manipulated into position interlockingly engaging the shoulders 18 at the kinks formed in the tines 12. The panel 15 may thereafter be employed to exert leverage on the tines to lift them from engagement with the tablet board 15' and out of overlapping relationship with respect to the upstanding ends of the board attached tines 12', to thus open the binder for attachment or removal of leaf sheets, in the manner substantially as heretofore described in connection with the embodiment shown in Figs. 1–7. It will be seen that, in the embodiment shown in Figs. 8 and 9, the tablet board 15' forms a lever adapted for permanent attachment on the tines 12', while the cover panel is detachably connectable as a lever on the tines 12 at the shoulder 18.

It is thought that the invention and its numerous attendant advantages will be fully understood from the foregoing description, and it is obvious that numerous changes may be made in the form, construction and arrangement of the several parts without departing from the spirit and scope of the invention, or sacrificing any of its attendant advantages, the forms herein disclosed being preferred embodiments for the purpose of illustrating the invention.

The invention is hereby claimed as follows:

1. A loose-leaf sheet binder comprising means forming spaced apart sheet engaging tines, helically coiled springs interconnected with said tines, the ends of alternate tines, remote from said springs, extending in opposite directions and the tines being normally biased by said springs to yieldingly hold said ends in relatively overlapping relationship, and means formed on said tines for engagement with lever members operable to draw the tines apart to binder open position against the influence of said spring means.

2. A loose-leaf sheet binder as set forth in claim 1, wherein the springs extending on opposite sides of a tine and interconnected therewith are coiled in opposite directions.

3. A loose-leaf sheet binder as set forth in claim 1, wherein the helically coiled springs extend between and are integrally interconnected with said tines.

4. A loose-leaf sheet binder as set forth in claim 1, wherein said tines are kinked between the spring connected and spring remote ends thereof to form shoulders for engagement with the lever members.

5. A loose-leaf sheet binder as set forth in claim 1, wherein alternate tines are oppositely bowed to provide sheet engaging ends adapted to be disposed in oppositely extending, overlapping relation when the binder is in closed sheet holding position.

6. A loose-leaf sheet binder as set forth in claim 1, wherein certain of said tines comprise board mounted tines formed for attachment on a tablet board in position with the spring remote ends thereof projecting away from the board, while others of said tines comprise spring pressed tines having spring remote ends disposed in position for yielding engagement with a tablet board intermediate said board mounted tines.

7. A loose-leaf sheet binder comprising a length of resilient spring wire material bent to form spaced apart hairpin loops providing sheet engaging tines and helically coiled spring portions intermediate and integrally interconnected with said tines, the sheet engaging ends of alternate tines, remote from said spring portions, extending in opposite directions and being normally biased by said spring portions toward relatively closed overlapping relationship, and shoulders formed on said tines for engagement with lever members operable to draw the tines apart to binder open position against the influence of said spring means.

8. A loose-leaf sheet binder comprising a length of resilient spring wire material bent to form spaced apart hairpin loops providing sheet engaging tines and helically coiled spring portions intermediate and integrally interconnected with said tines, the sheet engaging ends of alternate tines, remote from said spring portions, extending in opposite directions and being normally biased by said spring portions toward relatively closed overlapping relationship, said tines being kinked between said spring portions and the sheet engaging ends thereof to form seats for engagement with cover panels mounted on the tines whereby to constitute said panels as lever means operable to draw the tines mutually apart toward relatively open position against the contrary urge of said spring portions.

9. A loose-leaf sheet binder comprising a length of resilient spring wire material bent to form spaced apart hairpin loops providing sheet engaging tines and helically coiled spring portions intermediate and integrally interconnected with said tines, the sheet engaging ends of alternate tines, remote from said spring portions, extending in opposite directions and being normally biased by said spring portions toward relatively closed overlapping relationship, certain of said tines comprising board mounted tines and being formed for attachment on a tablet board in position with the ends of said board mounted tines projecting from the board, the others of said tines comprising spring pressed tines having ends yieldingly pressed against the board between said board mounted tines by action of said spring means, said spring pressed tines being kinked between said spring portions and the sheet engaging ends thereof to form seats for engagement with a cover panel mounted on the tines whereby to constitute said panel as lever means operable with said tablet board to draw the board mounted and spring pressed tines mutually apart toward relatively open position against the contrary urge of said spring portions.

References Cited in the file of this patent

UNITED STATES PATENTS

| | | |
|---|---|---|
| 580,362 | Barrett | Apr. 13, 1897 |
| 2,156,683 | Dunwoodie | May 2, 1939 |
| 2,617,423 | Miller | Nov. 11, 1952 |

FOREIGN PATENTS

| | | |
|---|---|---|
| 1,045,776 | France | July 1, 1953 |
| 525,107 | Belgium | Jan. 15, 1954 |